United States Patent [19]
Burt et al.

[11] Patent Number: 5,048,426
[45] Date of Patent: Sep. 17, 1991

[54] INTEGRATED CONVEYOR SYSTEM WITH TRANSFER OF TROLLIES

[75] Inventors: Harold S. Burt, Kansas City; Benjamin P. DiFalco, Overland Park, both of Kans.

[73] Assignee: Mid-West Conveyor Co., Inc., Kansas City, Kans.

[21] Appl. No.: 496,535

[22] Filed: Mar. 20, 1990

[51] Int. Cl.$^5$ .............................................. B61K 3/00
[52] U.S. Cl. ........................................ 104/88; 104/96; 104/91
[58] Field of Search ............... 104/29, 88, 89, 130, 104/170, 172.4, 250, 91, 93, 96; 198/339.1, 465.4; 29/823, 824, 281.4; 73/45.1, 865.9

[56] References Cited

U.S. PATENT DOCUMENTS

| | | | |
|---|---|---|---|
| Re. 25,288 | 11/1962 | Bishop et al. | 104/88 |
| 3,174,438 | 3/1965 | Hariton | 104/88 |
| 3,180,279 | 4/1965 | Thibault | 104/89 |
| 3,502,039 | 3/1970 | Patterson | 104/172.4 |
| 3,528,539 | 9/1970 | Speaker et al. | 104/88 |
| 3,734,027 | 5/1973 | Brummett et al. | 104/172.4 |
| 3,854,573 | 12/1974 | Freier, Sr. | 198/678 |
| 3,861,323 | 1/1975 | Turner | 104/172.4 |
| 3,880,086 | 4/1975 | Khondker | 104/172.4 |
| 4,050,385 | 9/1977 | Gurr et al. | 104/87 X |
| 4,265,178 | 5/1981 | Veith | 104/88 |
| 4,287,829 | 9/1981 | Wakabayashi | 104/89 |

Primary Examiner—Douglas C. Butler
Assistant Examiner—S. Joseph Morano
Attorney, Agent, or Firm—Litman, McMahon & Brown

[57] ABSTRACT

A conveyor system includes a power and free section transporting product carriers on power and free type trollies and a monorail section transporting utility carriers about a fixed loop. The monorail system is connected to the power and free section to receive and transport the trollies with the product carriers interspaced between the utility carriers.

5 Claims, 5 Drawing Sheets

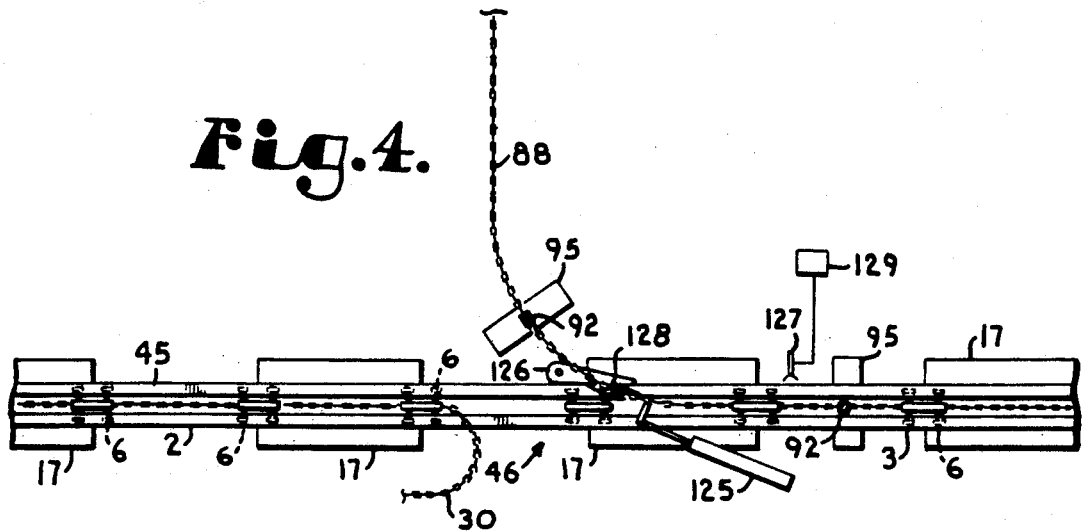
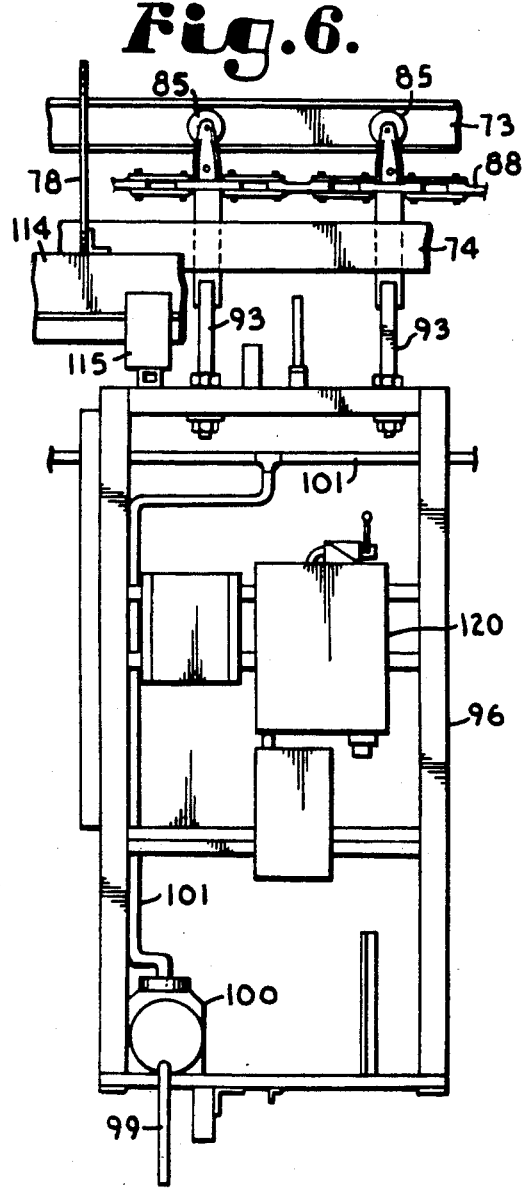
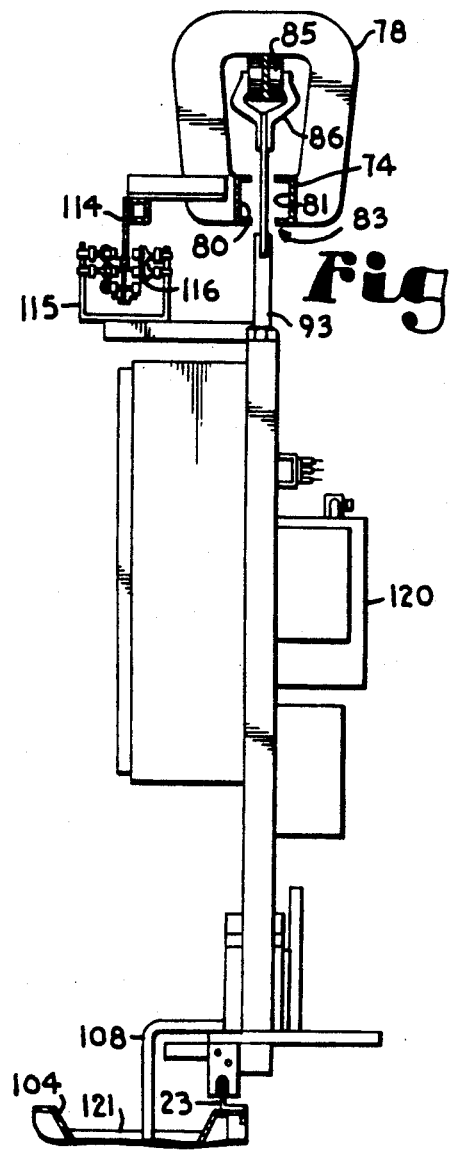

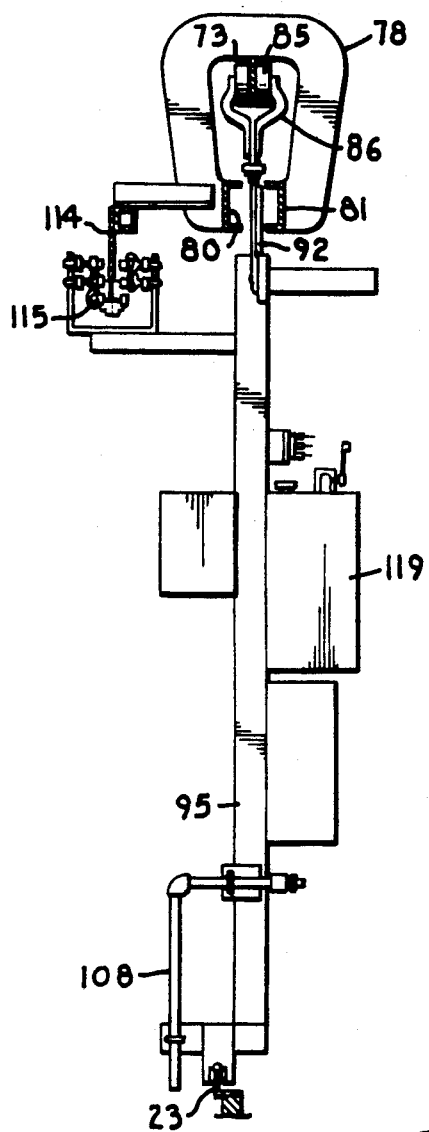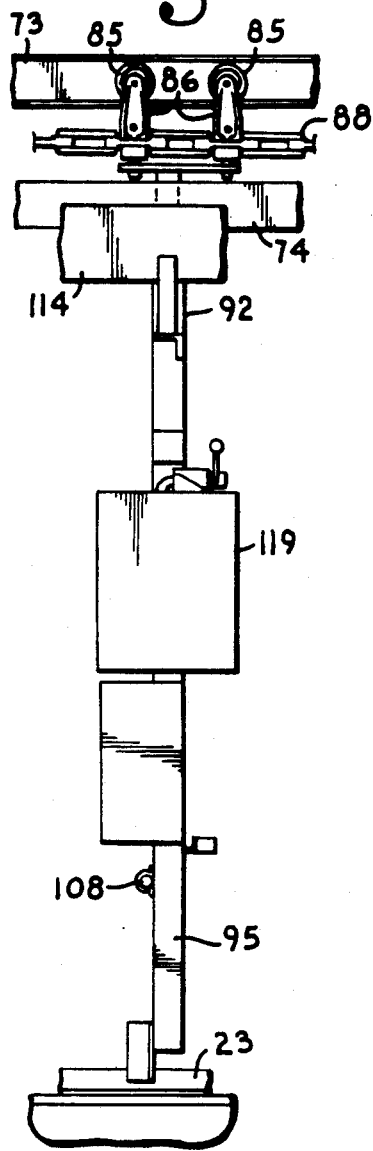

INTEGRATED CONVEYOR SYSTEM WITH TRANSFER OF TROLLIES

CROSS-REFERENCE TO RELATED APPLICATION

The present application is a continuation of United States application for patent Ser. No. 07/238,831 filed Aug. 30, 1988, now U.S. Pat. No. 4,939,999, having the same title.

BACKGROUND OF THE INVENTION

The present invention is related to a conveyor system and, in particular, to a conveyor system wherein a power and free conveyor having product carriers for transporting products is integrated with a monorail conveyor having utility carriers for use in conjunction with the product carriers.

Normally, after major appliances are manufactured, they are factory tested. For some appliances where testing requires only a short time period and is not complicated, such testing does not present a problem, but where the appliance must progress through an entire lengthy cycle in order to be properly tested and/or where the appliance requires special handling such as connection to a source of water or the like, such testing has often been very labor consuming and expensive. Often the appliance must be manually or machine transfered from the transport carrier to a testing carrier.

In particular, many factories have devised a linear conveyor upon which the product is placed and the product is tested as it passes down the conveyor. Normally, the product must be manually placed on and taken from the conveyor. Further, because the conveyor must be linear and the product testing may consume a substantial amount of time, the product must move either very slowly down the conveyor which limits capacity or the conveyor must be very long which is not always possible due to the dimensional constraints of the factory at which the product is produced.

Another type of prior art system utilized to test products in the past has been a rotating carousel-type device wherein the products are placed on the carousel and tested while revolving and then removed from the carousel after one full revolution. As with the previously described system, this type of system is substantially limited as to size and speed of the carousel and is quite labor intensive since it requires loading and unloading of the product relative to the carousel.

Therefore, it is desirable to have a system wherein the carrier which initially transports the product to the testing area can be utilized to likewise transport the product during the entire testing procedure and subsequently transport the product away from the testing area. Further, it is desirable for the system to allow interspacing of utility carriers among the product carriers. Such utility carriers can provide a source of water, electricity and the like to the product. Alternatively, the utility carriers can be utilized to carry testing equipment, tools for completion of the product or for testing the product and/or parts for use in conjunction with completing the product.

In the past, a monorail-type conveyor system wherein carriers have been hung from trolleys traveling on a suspended track and driven by a chain have been quite useful for certain purposes. Monorail systems are usually simple and quite well suited for closed loop applications where it is desirable for carriers to continuously move along a fixed path at a constant speed. Likewise, power and free conveyors wherein a drive chain drives a disengageable dog on a trolley supported on a track with a carrier transported by the trolley, have proved to be highly effective in certain types of transport, especially transport of product carriers of the type described above through and from manufacturing steps. The effectiveness of the power and free conveyor is especially found in that carriers can be accumulated at a particular point or can be stopped at a particular point for performing some certain function such as quick testing or the like. While a monorail conveyor is not typically designed to allow carriers conveyed thereby to stop at a particular place, such a conveyor is especially helpful in providing constant, even flow of equally spaced carriers. The present invention provides for integration of the two types of conveyors to provide for the advantages of both within the type of system described herein.

OBJECTS OF THE INVENTION

Therefore, the objects of the present invention are: to provide an integrated conveyor system wherein a power and free conveyor is operably joined with a monorail conveyor to provide a hybrid or monofree conveyor; to provide such a system wherein trolleys from a power and free conveyor system are taken into and operably driven by a monorail system; to provide such a system wherein the track configuration from the integrated system utilizing the power and free trolleys and the monorail conveyor is arranged in a serpentine configuration to take advantage of limited factory space; to provide such a system which allows for conveyance of product carriers by the power and free trolleys and for conveyance of utility carriers by the monorail system in such a manner that the product carriers and utility carriers may be interspaced with one another through a portion of the conveyor system; to provide such a system wherein, when the product carriers are interspaced with utility carriers, the trolleys of the product carriers are driven by the monorail conveyor associated with the utility carrier over a testing loop wherein products on the product carriers may be cycled through a complete testing cycle; to provide such a system which provides for integration of the power and free trolleys into the monorail system and separation of the power and free trolleys from the monorail system; and to provide such a system which is relatively inexpensive to construct, easy to use and particularly well adapted for the intended usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 4 is an enlarged and schematic cross-sectional view of the conveyor system illustrating an intersection between the product testing section and a power and free conveyor section, taken along line 4—4 of FIG. 3.

FIG. 6 is a fragmentary and enlarged side elevational view of the conveyor system showing a first utility carrier of the product testing section.

FIG. 7 is an enlarged cross-sectional view of the conveyor system, taken along line 7—7 of FIG. 2 showing the first carrier of the product testing section.

FIG. 8 is an enlarged cross-sectional view of the conveyor system, taken along line 8—8 of FIG. 2, showing a second utility carrier of the product testing section.

FIG. 9 is an enlarged and fragmentary side elevational view of the conveyor system showing the second utility carrier of the second section.

FIG. 10 is an enlarged, fragmentary and perspective view of the carrier system, showing details of a track for the monorail and a track for supporting the power and free trolleys while in the product testing section.

DETAILED DESCRIPTION OF THE INVENTION

Figure 1:
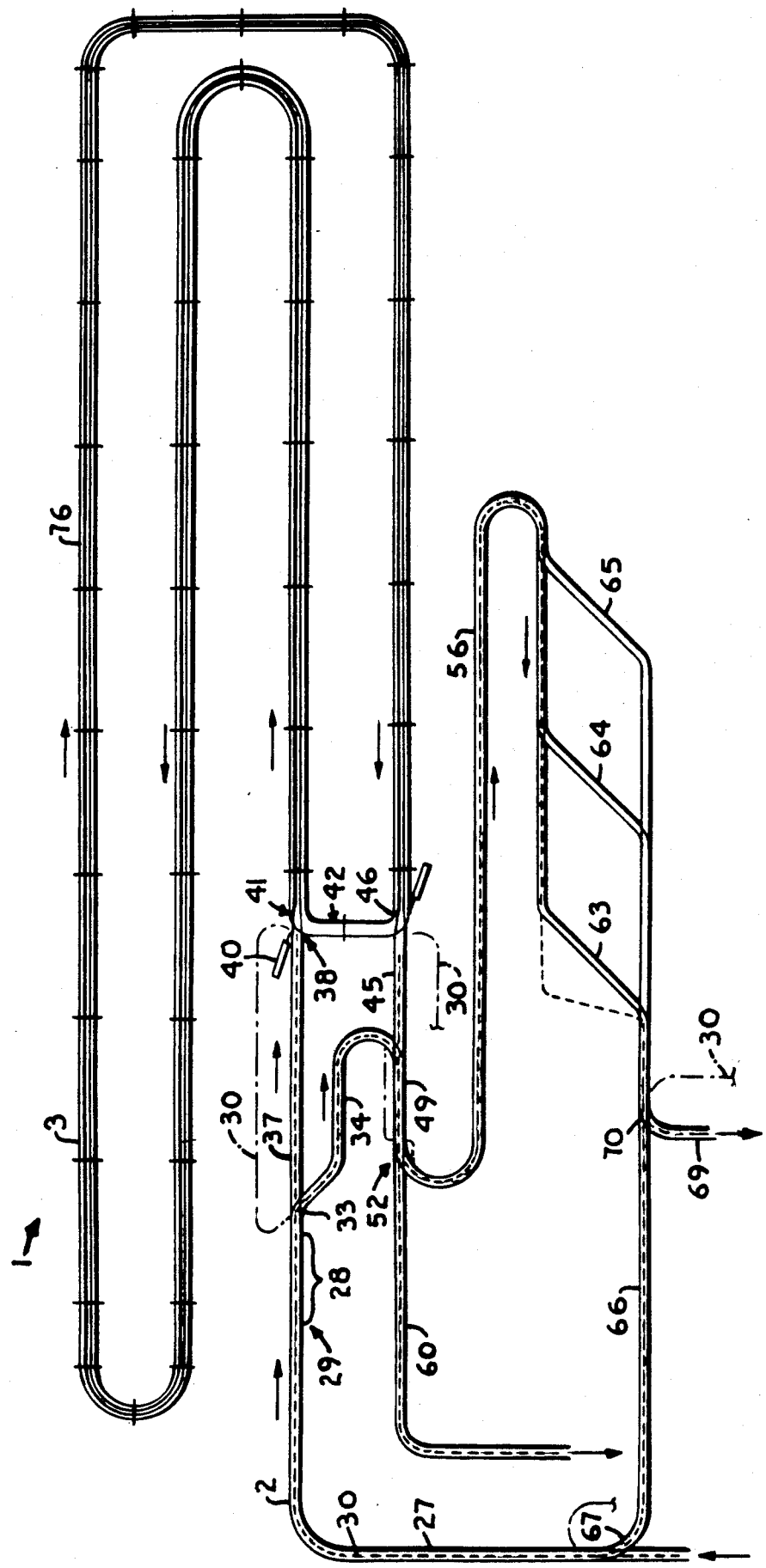
FIG. 1 is a highly schematic top plan view of a conveyor system in accordance with the present invention, illustrating the path of the various tracks associated with the system.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally designates a monofree or integrated conveyor system in accordance with the present invention. The integrated conveyor system 1 comprises a first section 2 which is a power and free conveyor and a second section 3 which is a modified monorail conveyor also transporting carriers from the first section 2 as will be described below.

The power and free first section 2 (see especially FIG. 12) carries and selectively drives a plurality of power and free trolleys 6 on a first lower track portion 4 and has a second upper track portion 5 spaced above the first track portion 4. The spacing between the portions 4 and 5 can be varied to engage or disengage the trolleys 6 with drive means described below. In the present embodiment, the trolleys 6 are paired and joined by a load supporting bar 7. Power and free trolleys, such as trolley 6, are well known in the prior art and, therefore, will only be generally described herein. The power and free trolleys are also seen in FIGS. 4 and 10, although at the position shown in these figures, the trolleys 6 are actually in the second section 3 rather than the first section 2. The power and free section upper track 5 includes a plurality of support trolleys 8 which ride on and are guided by parallel facing channels 9 of the upper track portion 5.

Each of the trolleys 6 include four wheels 10 extending in pairs from opposite sides of the trolley 6 which ride along the track portion 4. A trolley drive dog 11 extends upwardly from each of the trolleys 6.

Figure 2:
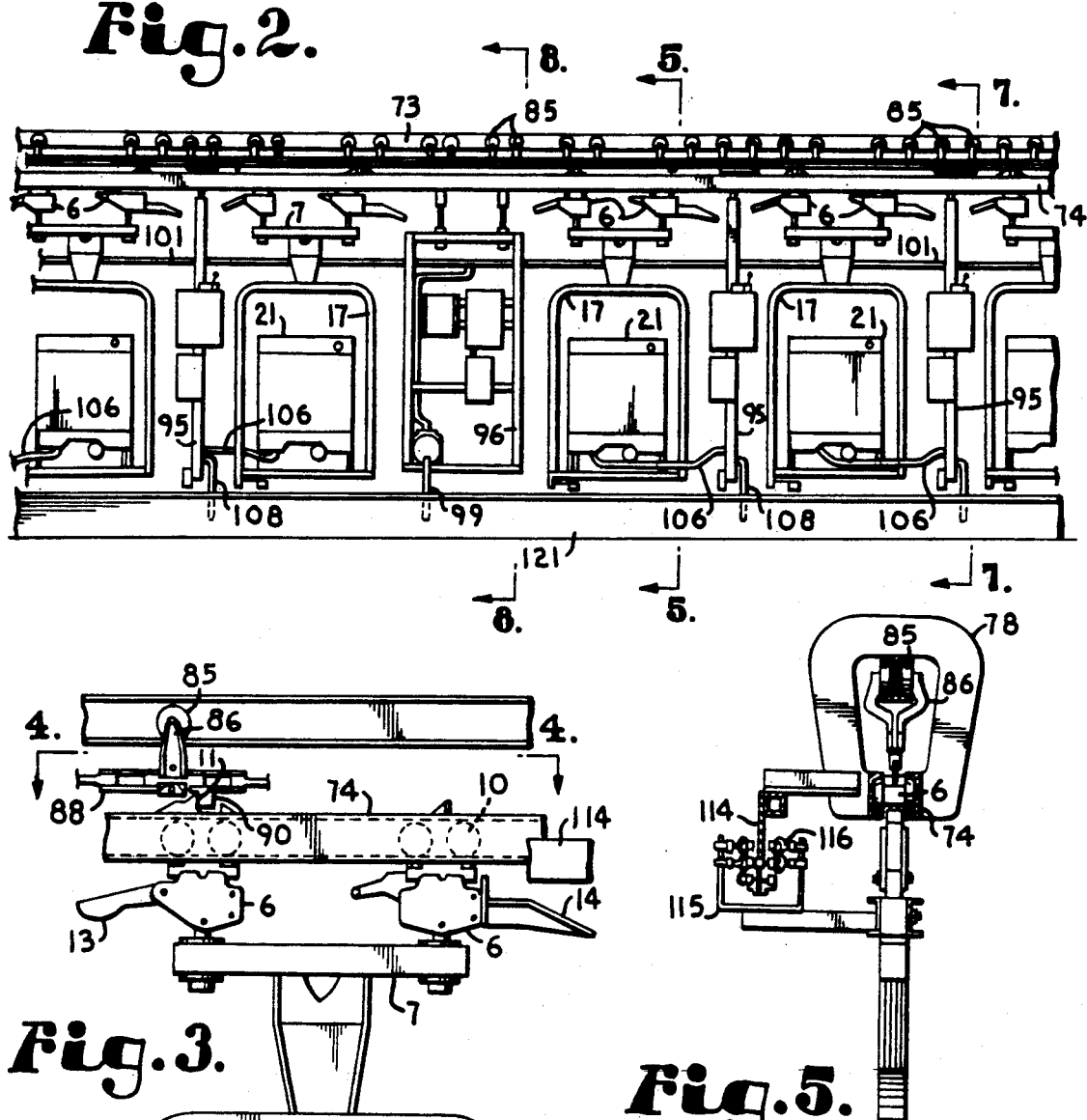
FIG. 2 is a fragmentary side elevational view of the conveyor system on an enlarged scale, illustrating a monorail and product testing section of the system.
Figure 3:
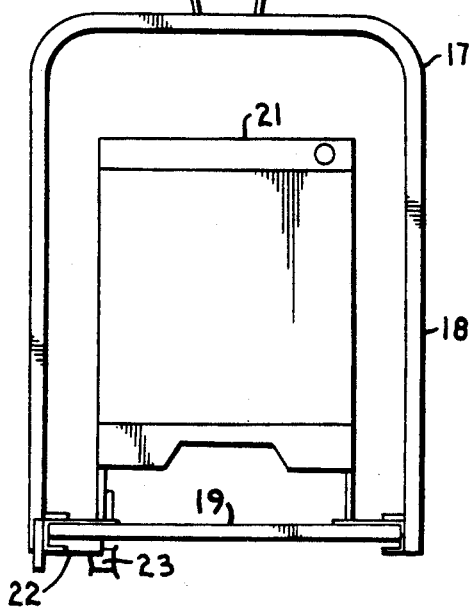
FIG. 3 is an enlarged, fragmentary and side elevational view of the monorail and product testing section of the conveyor system, illustrating a product carrier supported by power and free trolleys.
Figure 5:
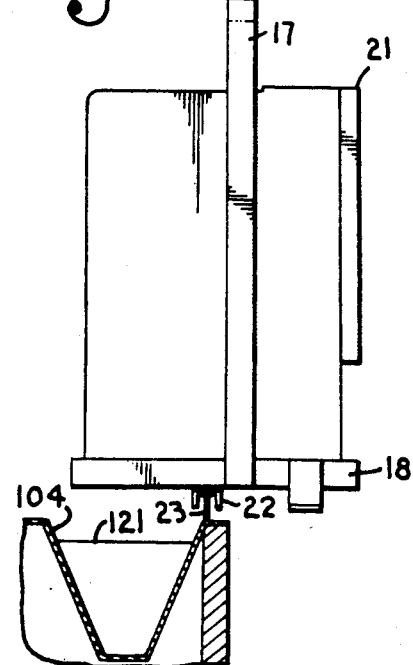
FIG. 5 is an enlarged cross-sectional view of the conveyor system, taken along line 5—5 of FIG. 2.

A lever 13 extends forwardly of the front trolley of each pair of trolleys 6. The rear trolley of each pair of trolleys 6 includes a cam surface 14 which extends rearwardly thereof. The lever 13 is connected to the dog 11 such that upward movement of the front end of the lever 13 causes the dog 11 to be drawn downwardly. The lever 13 may be urged upwardly by either engagement with the cam surface 14 of a trailing trolley of a next forward pair of trolleys 6, in order to accumulate trolleys and to prevent them from being driven over one another and/or damaging the drive mechanism or the lever 13 may be urged upwardly by a cam surface (not shown) positioned within the first section 2 so as to effectively stop the trolleys 6 at a particular point for staging, performing a function or the like. Each of the load supporting bars 7 attach to a pair of trolleys 6 and, in turn, is attached to a depending product carrier 17 such as is shown in FIGS. 2, 3 and 5.

In the illustrated embodiment, the product carrier 17 includes a generally rectangularly shaped frame 18 having a lower generally planar floor 19. Carried by each of the product carriers 17 is an appliance 21 that, in the illustrated embodiment, is a dishwasher. Mounted beneath the floor 19 is a channel 22 which faces and slides along a floor mounted elongate strip 23 to prevent the product carrier 17 from swinging from side to side as it is conveyed along the second section 3.

The first section 2 includes a delivery segment 27 which delivers product from a manufacturing area (not shown). The supply segment 27 transfers the product to a region designated 28 which includes a positive drive stop 29 effectively disengaging the dogs 11 of a trolley 6 from a drive chain 30 (illustrated as a dashed line in all figures except FIG. 12) in the region 28. In the region 28, a short electrical testing procedure is performed on the product 21 to ensure that there are no substantial electrical faults within the product which would endanger personnel in the second section 3. If an electrical fault is found in the product 21 within the region 28, a switch is activated at the location indicated by the arrow 33 and the product 21 with a respective carrier 17 and associated trolleys 6 thereof is diverted onto a by-pass segment 34.

Product 21 which passes the test in the region 28 is conveyed through the switch 33 into a staging segment 37. Near the end of the staging segment 37 is another stop 38 effectively disengaging the trolley dogs 11 from the drive chain 30 and causing product carriers 17 to accumulate therebehind. Successive carriers 17 are disengaged from drive by the drive chain 30 due to the action of subsequent levers 13 engaging cam surfaces 14 of trolleys 6 associated with already present carriers 17.

Pusher and synchronization means, such as a pusher 40, are provided at the intersection of the first section staging segment 37 and the second section 3. The pusher 40 engages one of the trolleys of each pair of trolleys 6 associated with a single carrier 17 and pushes that pair of trolleys 6 and the associated carrier 17 onto the second section 3. Further, at the intersection, is a switch 41 and a photoelectric sensor 42 positioned at the locations identified by the appropriate reference numerals. The switch 41 alternatively allows cariers of the second section 3 to pass, as will be described later, and thereafter allows a pair of trolleys 6 associated with a particular carrier 17 to enter the second section 3. The photoelectric sensor 42 identifies the passage of utility carriers (described below) along the second section 3 and includes a controller which synchronizes the pusher 40 and switch 41 to effectively interspace the product carrier 17 with the utility carriers.

Figure 11:
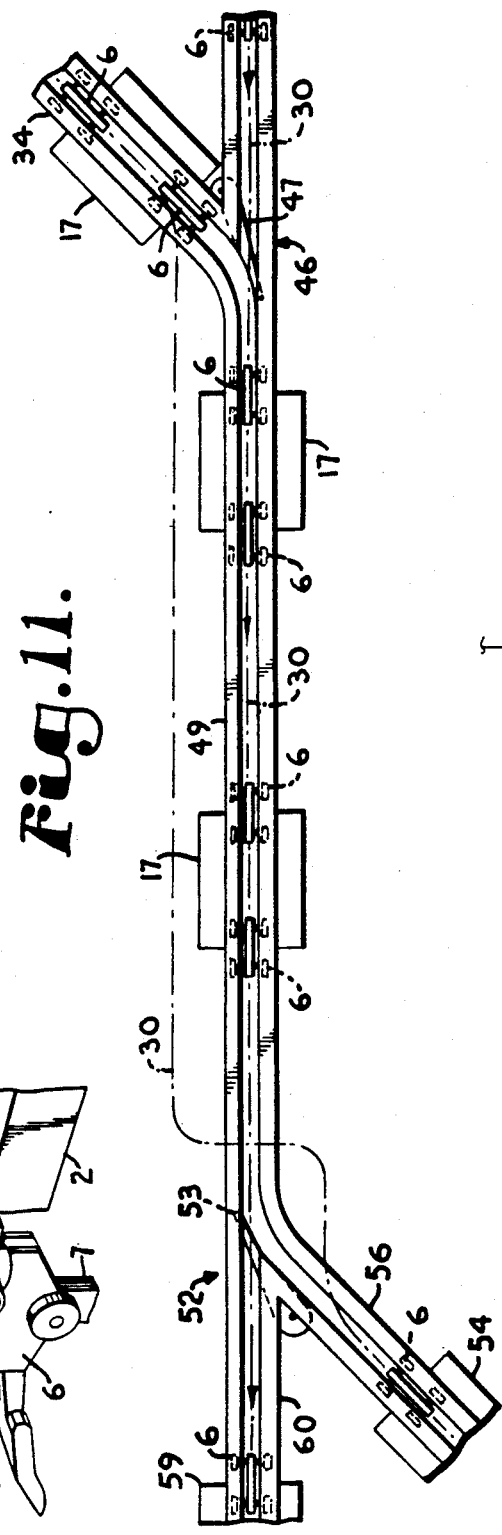
FIG. 11 is an enlarged and schematic top plan view of the power and free conveyor section showing a lower track and trolleys associated therewith.

Product carriers 17 are discharged from the second section 3 back onto the first section 2 in a discharge section 45. As seen in FIG. 11, the bypass section 34 reconnects with the discharge section 45 at an intersection identified by the reference numeral 46. A switch 47 is utilized to control the intersection 46 so that the carriers 17 do not run into one another. At this point, the carriers 17 are carrying some products 21 which have been found to be defective and others which have passed testing within the second section 3. Each product carrier 17 is identified electrically within a central control system such that testing personnel both in the region 28 and in the second section 3, can identify defective product 21 and so indicate to the controller. Hence, both of these products are on a common segment 49 of the first section 2.

At the flow end of the common segment 49 is a second intersection identified by the reference numeral 52 and controlled by a tongue-type switch 53. The switch 53 is, in turn, controlled by the beforementioned controller such that defective product identified by the reference numeral 54 is conveyed onto a repair segment 56. The non-defective product which has passed all testing procedures and which is identified by the reference numeral 59 is conveyed onto a finished product segment 60. The finished product segment 60 conveys the product 59 to storage or shipping (not shown). Defective product 54 is conveyed to repair bays 63, 64 and 65 wherein mechanics repair the defective product and pull by hand the carriers 17 along a non-chain driven portion of the first section 2. Repaired previously defective product is then conveyed by return segment 66 back to the supply segment 27 through the intersection indicated by the reference numeral 67. Product that cannot be repaired is discharged from the system 1 on a defective segment 69 joining with segment 66 at intersection 70.

The second section 3 inlcudes an upper monorail track 73 and a lower trolley track 74. The monorail track 73 forms a closed serpentine loop 76. The trolley track 74 follows substantially the entire loop 76 and is mounted in substantially constant spaced relationship with respect to the monorail track 73 positioned directly vertically thereabove. The trolley track 74 joins with the first segment lower track 4 at, for example, intersection 46 to allow trolleys 6 to pass therebetween. Space supports 78 maintain the spacing of the tracks 73 and 74 relative to one another. The upper track 73 is of a type generally associated with a conventional monorail conveyor, although it is foreseen that other types of tracks that would substantially support a drive chain would function for the intended purpose thereof. The trolley track 74 includes two facng C-shaped channels 80 and 81 extending the entire length of the loop 76 and forming a vertical slot 83 therebetween.

A plurality of support wheels 85 are mounted in pairs in opposed relationship to one another along the entire length of the monorail track 73. Pairs of the wheels 85 are connected by a common yoke 86 which allows rotation of the wheels 85 along the track 73 and maintains the paired wheels 85 on opposite sides of the track 73 which is generally I-shaped. Each of the yokes 86 is attached to a drive chain 88 which is continuous about the loop 76 and which is generally equally spaced from the monorail track 73 throughout the loop 76. The drive chain 88 is positioned above the trolley track 74 and continuously moves at a generally constant speed during operation of the conveyor system 1. The drive chain 88 has depending therefrom a plurality of trolley driving dogs 90 at preselected positions therealong for engaging and driving the trolley dogs 11. The drive chain 88 also has depending therefrom a plurality of first utility carrier support posts 92 and also a plurality of second utility carrier support posts 93. The posts 92 and 93 are directly attached to the chain 88 so as to fixedly travel therewith. The posts 92 and 93 generally alternate singly or in pairs with the dogs 90 along the chain 88.

The first utility support posts 92 have attached thereto and depending therefrom a first utility carrier 95. Pairs of the second support posts 93 have attached thereto a second utility carrier 96. Throughout the loop 76, the various carriers 17, 95 and 96 (except between the discharge and entry of the product carriers 17 into the loop 76) are fixed spaced and positioned such that the product carriers 17 alternate with the utility carriers 95 and 96. In the present embodiment, six utility carriers 95 are positioned between each pair of utility carriers 96 for a purpose which will be described below.

In particular, the utility carriers 96 are designed to pump water to the six closest product carriers 17 through the likewise six closest utility carriers 95 (three on each side). Each utility carrier 96 includes a depending hose 99, a pump 100 and a distribution conduit 101. The hose 99 is drawn through a water trough 104, such that, upon operation of the pump 100, water is drawn through the hose 99 and the pump 100 into the distribution conduit 101. The distribution conduit 101 is, in turn, connected with each of the six closest utility carriers 95. When the product carriers 17 enter into the loop 76, a tester connects product hoses 106 supplying water to and discharging water from the product 21 to appropriate connections in the utility carriers 95 closest to the product 21. In particular, the product supply hose is connected to the distribution conduit 101 and the product discharge hose is connected to a drain or discharge conduit 108 on each carrier 95 which is positioned to discharge into the trough 104.

Each of the carriers 95 include an electrical system for supplying electricity to the products 21 for testing. In particular, an electrical bus bar 114 is mounted so as to depend from the supports 78 and to follow the entire length of the loop 76. Electricity is fed to the bus bar 114. Each of the carriers 95 and 96 include a bus follower 115 with suitable sliding brushes 116 for engaging and transferring electricity from the bus bar 114 to the appropriate carrier 95 or 96. The electricity in the carriers 95 is transferred to an electrical controll panel 119 which allows operation by a tester and which also allows the tester to signal the central controller if one of the products is defective. Likewise, each of the carriers 96 includes an electrical control panel 120 receiving electricity from the bus 114 and for use by the tester in testing the products 21 as well as energizing the pumps 100.

The trough 104 is best seen in FIGS. 5 and 7. The trough 104 is a V-shaped channel extending substantially the entire length of the loop 76 and suitable for holding water therein such that the hoses 99 of each of the carriers 96 is able to be pulled through and drawn from the water 121 therein during the entire time period required to traverse the loop 76. The discharge conduits 108 of each of the utility carriers 95 is positioned to discharge into the trough 104.

Seen in FIG. 4 is the discharge intersection 46 of the product carriers 17 from the second section 3 to the first section 2. FIG. 4 is a top view of the lower level of the system 1 at this location. A pusher 125 is provided for pushing one of a pair of trolleys 6 associated with a particular carrier 17 along the track segment 45 through the region between whereat the drive chain 88 releases the trolley dogs 11 and whereat the trolley dogs 11 are subsequently engaged by the first section drive chain 30. A switch 126 is also provided at the intersection 46. The switch 126 is effectively controlled by a photoelectric sensor 127 connected to the controller identified by a box 129. The purpose of the switch is to divert the carriers 95 and 96 in the proper direction along the path of the drive chain 88, whereas the product carriers 17 are diverted onto discharge section 45 under direction of the controller 129 which is operably connected and directs the rest of the system 1 also. A slot 128 is provided in the side of the trolley track 74 closest to the switch 126. The purpose of the slot 128 is to allow the carrier posts 92 and 93 to escape from the main track slot 83. This can be better visualized if it is remembered that FIG. 4 is a view of the bottom layer of the system 1 and that the posts 92 and 93 extend upwardly through the slot 83 in the middle of the trolley track 74. It is also noted that the trolley track 74 operably joins with the first section at the intersection 46.

Figure 12:
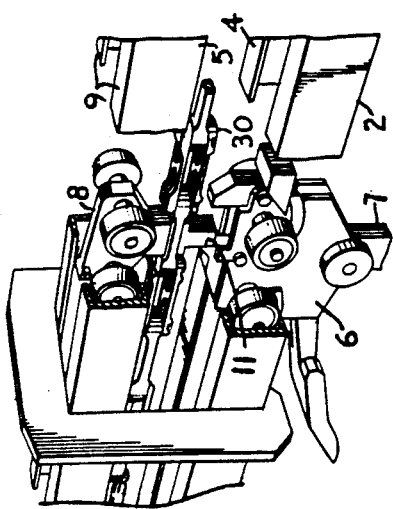
FIG. 12 is an enlarged and fragmentary perspective view of the power and free conveyor system, showing power and free trolleys driven by a power and free drive chain.
Figure 13:
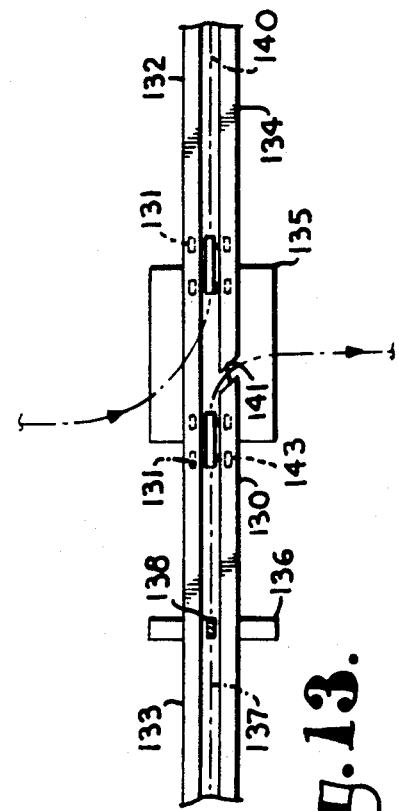
FIG. 13 is a fragmentary and schematic cross-sectional view of a lower half of a modified integrated conveyor system, showing details of an intersection between a combined monorail system and power and free section.

It is to be noted with respect to FIG. 1 that the diagram shown therein is highly schematic. In particular, this diagram is only designed to show the various flows of the track and does not include any of the carriers. Also, it is noted that, in the loop 76, the track is shown as being four lines wide for the purpose of signifying the integration of both the monorail track and the power and free trolley track. Whereas, the first section 2 is only shown as being two lines to identify the power and free track. The chain 30 is shown in FIG. 1 to illustrate the various paths thereof whereas the chain 88 is not included since it is continuous throughout the loop 76. The first section 2 includes two tracks 4 and 5 as is shown in FIG. 12.

It is noted that the drive chains 30 and 88 are operably driven by drive mechanisms (not shown) that are well known in the conveyor art and hence are not described in detail herein.

In use, the product 21 to be tested is conveyed along the power and free supply segment 27 to the region 28 whereat positive drive is removed from the trolleys 6 associated with a particular product 21. The product 21 is tested for electrical faults and, if faults are found, sent to the repair bays 63, 64 and 65 via the bypass segment 34 and repair segment 56 after which the repaired product is returned to the supply segment 27 or, if the product cannot be repaired, is discharged by way of the defective segment 69.

Product 21 which is not found to have an electrical fault is transferred to the staging segment 37 and fed by operation of the pusher 40 and switch 41 into the loop 76. Operation of the pusher 40 is controlled by a sensor so as to position each product carrier 17 between two utility carriers 95 and/or 96. A tester then hooks the appropriate hose 106 of the product 21 to the water distribution conduit 101 or discharge conduit 108 carried by an adjacent utility carrier 95. The product 21 is also hooked to the electrical supply on the adjacent carrier 95 and the tester sets the controls to sequence the product 21 through a complete operational cycle. The loop 76 is of sufficient length and the speed of the drive chain 88 is controlled such that the product 21 traverses substantially the entire loop 76 during the testing cycle, including the time required to connect and disconnect the product 21 from an associated carrier 95. In this manner, the tester can determine if any part of the product 21 is functioning improperly. Defective product 21 is tagged or electrically noticed to the central controller 129 such that it is transferred to one of the repair bays 63, 64 and 65 upon discharge from the loop 76.

Shown in FIG. 12 is a lower level of fragmentary top view of a modified conveyor system 130 which is otherwise similar to the system 1. The particular area shown in FIG. 12 is the location associated with the discharge of power and free type trolleys 131 along a trolley track 132 from a testing loop 133 to a power and free section 134. Adjacent pairs of the trolleys 131 transport a product carrier 135 and also conveyed along the loop 133 are utility carriers 136. The utility carriers 136 are conveyed by a drive chain 137 by a connector post 138 which passes through the center of the trolley track 132. The trolleys are conveyed along the power and free section 134 by a drive chain 140. A relatively sharp-angled slot 141 is provided in one side of the trolley track 134 to allow passage of the utility carrier post 138 therethrough. In this embodiment, the slot 141 is sufficiently narrow to allow wheels 143 associated with the trolleys 131 to pass or "jump" over the slot 141. In this manner, a switch, as was provided with the previous embodiment, is not required. Otherwise, the embodiment of the system 130 functions and operates quite similar to the previously described embodiment.

It is to be understood that while certain forms of the present invention have been illustrated and described herein, it is not to be limited to the specific forms or arrangement of parts described and shown.

What is claimed and desired to be secured by Letters Patent is as follows:

1. In an integrated conveyor system wherein a plurality of power and free trolleys of a raised power and free first conveyor ride upon and are transported along a path of the power and free conveyor and further wherein said trolleys drive associated transferable carriers about the power and free conveyor, the improvement comprising:

(a) a raised loop second conveyor continuously moving at a generally constant speed during operation of the system and cooperating with said first conveyor; said power and free trolleys being supported by, riding on and being transferable between a first overhead track of said first conveyor and a second overhead track of said second conveyor with associated carriers at specific locations therealong such that said transferable trolleys travel along fixed paths associated with said tracks and such that said trolleys and the carriers associated therewith are transportable about said second conveyor for a generally fixed period of time.

2. The system according to claim 1 wherein:
(a) said loop includes a monorail type conveyor having a drive chain; and
(b) said trolleys are driven by said drive chain while in said loop.

3. The system according to claim 1 wherein:
(a) said loop is serpentine.

4. The system according to claim 1 including:
(a) switching means for switching said trolleys between the power and free first conveyor and said loop so as to transfer associated product carriers to and from said loop.

5. In an integrated conveyor system wherein a plurality of power and free trolleys of a power and free first conveyor ride upon and are transported along a path of the power and free conveyor and further wherein said trolleys drive associated transferable carriers about the power and free conveyor, the improvement comprising:
(a) a loop second conveyor continuously moving at a generally constant speed during operation of the system and cooperating with said first conveyor; said power and free trolleys riding on and being transferable between a first track of said first conveyor and a second track of said second conveyor at specific locations therealong such that said transferable trolleys and the carriers associated therewith are transportable about said second conveyor for a generally fixed period of time;
(b) said second conveyor including a power and free track generally adjacent to a monorail track;
(c) said monorail track having a plurality of monorail trolleys that ride upon said monorail track; and
(d) said power and free trolleys from said first conveyor being transferred to said second conveyor power and free track so as to be conveyed along said second conveyor between said monorail trolleys.

* * * * *